(12) United States Patent
Wesby-van Swaay

(10) Patent No.: US 8,094,010 B2
(45) Date of Patent: *Jan. 10, 2012

(54) PROGRAMMABLE COMMUNICATOR

(76) Inventor: Eveline Wesby-van Swaay, Tiddington (GB)

(*) Notice: Subject to any disclaimer, the term of this patent is extended or adjusted under 35 U.S.C. 154(b) by 126 days.

This patent is subject to a terminal disclaimer.

(21) Appl. No.: 12/538,603

(22) Filed: Aug. 10, 2009

(65) Prior Publication Data

US 2010/0035580 A1 Feb. 11, 2010

Related U.S. Application Data

(63) Continuation of application No. 11/329,212, filed on Jan. 10, 2006, now Pat. No. 7,583,197, which is a continuation of application No. 10/296,571, filed as application No. PCT/EP01/05738 on May 18, 2001, now abandoned.

(30) Foreign Application Priority Data

May 23, 2000 (FI) .................................... 20001239

(51) Int. Cl.
*G08B 1/08* (2006.01)
*G08B 23/00* (2006.01)
*G08B 5/22* (2006.01)
*H04Q 1/30* (2006.01)

(52) U.S. Cl. ............. 340/539.12; 340/573.4; 340/693.5; 340/7.29; 340/7.33; 340/7.52

(58) Field of Classification Search ............. 340/539.12, 340/573.4, 693.5, 7.29, 7.33, 7.52; 455/456, 455/456.2, 418–419, 425; 379/142, 373, 379/375
See application file for complete search history.

(56) References Cited

U.S. PATENT DOCUMENTS

| | | | |
|---|---|---|---|
| 4,465,904 A | 8/1984 | Gottsegen et al. | 179/5 R |
| 4,855,713 A | 8/1989 | Brunius | 340/506 |
| 4,908,853 A | 3/1990 | Matsumoto | 379/355 |
| 4,951,029 A | 8/1990 | Severson | 340/506 |
| 5,276,729 A | 1/1994 | Higuchi et al. | 379/58 |
| 5,293,418 A | 3/1994 | Fukawa | 379/58 |
| 5,381,138 A | 1/1995 | Stair et al. | 340/825.44 |
| 5,396,264 A | 3/1995 | Falcone et al. | 345/146 |
| 5,548,271 A | 8/1996 | Tsuchiyama et al. | 340/311.1 |

(Continued)

FOREIGN PATENT DOCUMENTS

DE 196 25 581 12/1997

(Continued)

OTHER PUBLICATIONS

Azzaro et al., U.S. Appl. No. 60/162,249, dated Oct. 28, 1999 (21 pages).

*Primary Examiner* — Nam V Nguyen
(74) *Attorney, Agent, or Firm* — Sunstein Kann Murphy & Timbers LLP

(57) ABSTRACT

A programmable communicator device is disclosed having a wireless communications circuit, including an antenna, configured to receive a transmission, and an identity module having a unique identifier. The programmable communicator further includes a processing module including program code configured to determine if the transmission is from an authenticated caller by determining whether a received transmission contains the unique identifier, and memory configured to store telephone numbers or IP addresses received in transmissions from an authenticated caller.

197 Claims, 3 Drawing Sheets

U.S. PATENT DOCUMENTS

| | | | |
|---|---|---|---|
| 5,581,599 A | 12/1996 | Tsuji et al. | 379/63 |
| 5,581,803 A | 12/1996 | Grube et al. | 455/54.1 |
| 5,623,533 A | 4/1997 | Kikuchi et al. | 379/58 |
| 5,689,442 A | 11/1997 | Swanson et al. | 364/550 |
| 5,689,563 A | 11/1997 | Brown et al. | 380/23 |
| 5,742,666 A | 4/1998 | Alpert | 379/58 |
| 5,745,049 A | 4/1998 | Akiyama et al. | 340/870.17 |
| 5,752,976 A | 5/1998 | Duffin et al. | 607/32 |
| 5,774,804 A | 6/1998 | Williams | 455/419 |
| 5,802,460 A | 9/1998 | Parvulescu et al. | 455/92 |
| 5,831,545 A | 11/1998 | Murray et al. | 340/825.49 |
| 5,878,339 A | 3/1999 | Zicker et al. | 455/419 |
| 5,884,161 A | 3/1999 | Hegeman | 455/414 |
| 5,903,634 A | 5/1999 | Wakabayashi et al. | 379/127 |
| 5,940,752 A | 8/1999 | Henrick | 455/419 |
| 5,946,636 A | 8/1999 | Uyeno et al. | 455/566 |
| 5,948,064 A | 9/1999 | Bertram et al. | 709/225 |
| 5,960,366 A | 9/1999 | Duwaer | 455/556 |
| 5,974,312 A * | 10/1999 | Hayes et al. | 455/419 |
| 5,995,603 A * | 11/1999 | Anderson | 379/142.05 |
| 5,999,990 A | 12/1999 | Sharrit et al. | 710/8 |
| 6,026,293 A | 2/2000 | Osborn | 455/411 |
| 6,031,828 A | 2/2000 | Koro et al. | 370/336 |
| 6,041,229 A | 3/2000 | Turner | 455/420 |
| 6,072,396 A * | 6/2000 | Gaukel | 340/573.4 |
| 6,075,451 A | 6/2000 | Lebowitz et al. | 340/825.06 |
| 6,078,948 A | 6/2000 | Podgorny et al. | 709/204 |
| 6,108,521 A | 8/2000 | Foladare et al. | 455/31.3 |
| 6,125,273 A | 9/2000 | Yamagishi | 455/411 |
| 6,144,859 A | 11/2000 | LaDue | 455/511 |
| 6,148,197 A | 11/2000 | Bridges et al. | 455/432 |
| 6,157,318 A | 12/2000 | Minata | 340/825.44 |
| 6,172,616 B1 | 1/2001 | Johnson et al. | 340/870.12 |
| 6,198,390 B1 * | 3/2001 | Schlager et al. | 340/540 |
| 6,208,039 B1 | 3/2001 | Mendelsohn et al. | 307/52 |
| 6,208,839 B1 | 3/2001 | Davani | 455/31.3 |
| 6,208,854 B1 | 3/2001 | Roberts et al. | 455/417 |
| 6,215,994 B1 | 4/2001 | Schmidt et al. | 455/419 |
| 6,230,002 B1 | 5/2001 | Flodén et al. | 455/411 |
| 6,275,143 B1 | 8/2001 | Stobbe | 340/10.34 |
| 6,288,641 B1 | 9/2001 | Casais | 340/539 |
| 6,289,084 B1 | 9/2001 | Bushnell | 379/67.1 |
| 6,295,449 B1 | 9/2001 | Westerlage et al. | 455/422 |
| 6,308,083 B2 | 10/2001 | King | 455/556 |
| 6,314,270 B1 | 11/2001 | Uchida | 455/67.1 |
| 6,377,161 B1 | 4/2002 | Gromelski et al. | 340/7.45 |
| 6,411,198 B1 | 6/2002 | Hirai et al. | 340/7.6 |
| 6,424,623 B1 | 7/2002 | Borgstahl et al. | 370/230 |
| 6,442,432 B2 | 8/2002 | Lee | 607/59 |
| 6,487,478 B1 | 11/2002 | Azzaro et al. | 701/24 |
| 6,496,777 B2 | 12/2002 | Tennison et al. | 701/213 |
| 6,553,418 B1 | 4/2003 | Collins et al. | 709/224 |
| 6,573,825 B1 | 6/2003 | Okano | 340/7.51 |
| 6,577,881 B1 | 6/2003 | Ehara | 455/563 |
| 6,606,508 B2 | 8/2003 | Becker et al. | 455/567 |
| 6,611,755 B1 | 8/2003 | Coffee et al. | 701/213 |
| 6,633,784 B1 | 10/2003 | Lovelace, II et al. | 700/65 |
| 6,658,586 B1 | 12/2003 | Levi | 714/4 |
| 6,759,956 B2 | 7/2004 | Menard et al. | 340/539.19 |
| 6,832,102 B2 | 12/2004 | I'Anson | 455/556.1 |
| 6,833,787 B1 | 12/2004 | Levi | 340/539.13 |
| 6,873,842 B2 | 3/2005 | Elayda et al. | 455/418 |
| 6,922,547 B2 | 7/2005 | O'Neill et al. | 455/17 |
| 6,970,917 B1 | 11/2005 | Kushwaha et al. | 709/217 |
| 6,985,742 B1 * | 1/2006 | Giniger et al. | 455/456.1 |
| 6,988,989 B1 | 1/2006 | Weiner et al. | 600/300 |
| 7,027,808 B2 | 4/2006 | Wesby | 455/419 |
| 7,084,771 B2 * | 8/2006 | Gonzalez | 340/573.1 |
| 7,254,601 B2 | 8/2007 | Baller et al. | 709/200 |
| 7,558,564 B2 | 7/2009 | Wesby | 455/419 |
| 7,583,197 B2 | 9/2009 | Wesby Van Swaay | 340/573.4 |
| 7,599,681 B2 | 10/2009 | Link, II et al. | 455/411 |
| 2001/0001234 A1 | 5/2001 | Addy et al. | 340/531 |
| 2002/0046353 A1 | 4/2002 | Kishimoto | 713/202 |
| 2002/0080938 A1 | 6/2002 | Alexander, III et al. | 379/106.01 |
| 2002/0198997 A1 | 12/2002 | Linthicum et al. | 709/227 |
| 2003/0176952 A1 | 9/2003 | Collins et al. | 700/286 |
| 2010/0035580 A1 | 2/2010 | Wesby - Van Swaay | 455/411 |

FOREIGN PATENT DOCUMENTS

| | | |
|---|---|---|
| DE | 197 07 681 | 5/1998 |
| EP | 0 432 746 | 6/1991 |
| EP | 0 524 652 | 1/1993 |
| EP | 0 772 336 | 5/1997 |
| EP | 0 996 302 | 4/2000 |
| EP | 1 013 055 | 4/2005 |
| JP | 07-087211 | 3/1995 |
| JP | 09-64950 | 3/1997 |
| JP | 2000-115859 | 4/2000 |
| JP | 2000-135384 | 5/2000 |
| JP | 2001-177668 | 6/2001 |
| JP | 2001-249860 | 9/2001 |
| JP | 2002-077438 | 3/2002 |
| WO | WO 97/23104 | 6/1997 |
| WO | WO 98/51059 | 11/1998 |
| WO | WO 99/13629 | 3/1999 |
| WO | WO 99/34339 | 7/1999 |
| WO | WO 00/56016 | 9/2000 |
| WO | WO 00/70889 | 11/2000 |
| WO | WO 01/03414 | 1/2001 |

* cited by examiner

PROGRAMMABLE COMMUNICATOR

CROSS REFERENCE TO RELATED APPLICATIONS

This patent application is a continuation of and claims priority from all priority dates of U.S. patent application Ser. No. 11/329,212, filed Jan. 10, 2006, and entitled "Programmable Communicator". As a consequence of this priority claim, this patent application also claims priority to U.S. patent application Ser. No. 10/296,571, filed Jan. 21, 2003, and entitled "Programmable Communicator," which is a National Phase filing of and claims priority to PCT/EP01/05738 filed on May 18, 2001, which further claims priority from Finland Application 20001239, filed May 23, 2000. The disclosures of each of these applications are incorporated herein by reference in their entirety.

BACKGROUND OF THE INVENTION

The invention relates to a programmable wireless communications apparatus. More particularly, it relates to a programmable wireless communications apparatus, which can provide an improved means of communication between children and their parents, between elderly persons and caring relatives, and between mentally less-able individuals and supervising adults. In addition, the invention provides a solution for smart clothes applications, which may comprise a telecommunications means within the lining of a jacket or other article of clothing, as well as a solution for user-programmable data tags which convey information from remotely located devices such as vending machines. The invention relates to and significantly improves upon a previously filed patent application claiming Finnish priority of Sep. 9, 1997 entitled a Portable Hotlink Communicator published as international patent application PCT/GB98/02715.

In this previously filed application, is taught the invention of using a mobile phone comprising a programmable identity module such as a SIM card, in the context of the GSM telecommunications standard, to program the number of any mobile or fixed telephone to which the Hotlink communicator, comprising a similar type of programmable identity module, is to be linked. Existing and known methods of communication between the mobile phone and Hotlink communicator for the purpose of programming comprise the obvious choice of data calls such as the Short Message Service in the GSM telecommunications standard. Alternatively a PDA type communicator might call up a web page to instruct a network element to program the programmable identity module of the Hotlink with the number of any fixed or mobile telephone to which the Hotlink communicator is to be linked.

This use of a separate mobile phone to program the number to which the Hotlink may call is particularly useful and convenient should a parent wish to change the number if the parent must leave shortly and want that the Hotlink is connected immediately to the mobile phone or fixed line of another parent or supervising neighbour.

The current invention builds upon the teaching of this earlier application and extends the concept significantly that it has more general and suitable application to both the child Hotlink communicator and also to the field of programmable wireless data communication tags for the purpose of providing information about the status of a vending machine or other piece of technical equipment such as a home appliance or a device to monitor whether a door is open or closed.

In addition to this, the current invention relates directly to programmable wireless data communication tags, which comprise the means to be interfaced directly with other technical equipment such that each tag can be programmed remotely by any means to be linked to any fixed or mobile telephone to enable data to be sent to or from the device and to allow a person to make a voice call connection to the linked telephone.

Today parents are concerned whether to provide a young child with a mobile phone or not. The concern relates to the cost of the mobile phone should it be lost or stolen and also to the cost of the use of the mobile phone. Clearly there is a need to provide a means to limit the cost of calling and also to provide a means to prevent the child dialing overseas numbers for extensive periods of time.

In the context of mobile phone operators, there exists a need to provide a simple and effective communication device, which can provide the means for family tariffing such that subscriptions for children can be related to the subscriptions of their parents' mobile phones. An improved child Hotlink communicator, which restricts the usage of the mobile phone and thereby does not generate high charges through uncontrolled calling, is clearly a solution to the family tariffing challenge.

Parents are often concerned about the whereabouts of their children and new positioning technologies are being developed for locating mobile phones. These solutions include self-positioning solutions and remote positioning solutions. One example of a self-positioning solution includes the satellite-based Global Positioning System technology in which the mobile phone comprising a GPS signal processing circuit is able to determine the coordinates of its own position by processing signals received from satellites and communicate these coordinates to a location centre associated with the network. One example of a remote positioning solution is the method taught in U.S. Pat. No. 5,051,741 claiming priority of Mar. 27, 1990 in which the mobile phone is paged and caused to transmit a response which is processed by communication stations such as time-of-arrival measurement units associated with the network of master stations or base stations.

This remote positioning method has the advantage that the position of the mobile phone can be determined by making use of existing signalling between the mobile phone and the network without requiring any changes to the mobile phone, which would increase its cost. The generic network-based, remote-positioning architecture method of U.S. Pat. No. 5,051,741 may make use of time of arrival methods or phase difference calculations to increase the resolution of the area or sector within which the mobile phone is located.

While the location of the mobile phone itself is a good indication of the present location of the person carrying the mobile phone, an improvement would be a means to lock the mobile phone to the child, such that use of the mobile phone positioning technologies would then determine the position of the child.

In addition to these concerns about the failures of existing mobile communications technology to provide an improved and more secure method of instant communication between a parent and a young child, and the means to determine the position of the child, there is additional concern that the battery of the communicator may drain its power without the parent knowing, or may be removed, which would prevent the communicator from receiving calls or dialing to the programmed fixed or mobile number to which the communicator is linked.

In addition to these specific communication problem needs, there is a growing yet unsubstantiated concern about the potentially harmful effect of electromagnetic radiation from mobile phones upon the developing brains of young children. Within this context, there is an opportunity to design a communication device for children, which positions the radiating electromagnetic field of a communication device away from the close proximity of the brain. In this regard, parents who maintain the belief that mobile telephones present a health risk due to the radiating antenna may rest secure in the knowledge that this risk can be significantly reduced.

In a separate context, there exists a growing need for a mobile telephone solution, which is cost effective to manufacture, but which is versatile such that it can form the basis for a smart clothes tag or communications application platform. In this context the requirement is for an embedded mobile phone platform comprising no keypad or display, which may be sewn into the lining of a jacket, or other article of clothing, having only the call button protruding and a simple pin connection to recharge the battery. The problem with prior art solutions is that unless the smart clothes tag can be user-programmable to call any fixed or mobile number by making use of an acceptable method such as via an SMS data call or via a BlueTooth radio transmission from a mobile phone or intelligent PDA, the solution is impractical to implement.

In security applications where emergency service personnel carry hand-held primary communications devices such as conventional mobile phones, a back-up communications device such as a smart clothes embedded tag can be of great value in the instance that the primary communications device is lost or broken.

In sports areas such as on lakes where there may be people using canoes, a smart clothes communications tag embedded in a life vest may serve to alert a central control point that a person is in difficulty and also to alert other persons in the area to go to their rescue.

In an additional application area, skiers in difficulty would benefit from a smart clothes user-programmable communications tag attached to their clothing, which is pre-programmed to be linked with a fixed or mobile telephone and need only have its protruding button pressed to make communication with a central alarm point.

In an additional application area there exists the need for a user-programmable remote wireless communications data tag, which can be used to relay information about the status of a remote piece of technical equipment such as a vending machine. Home networks could be simplified by making use of the existing mobile network infrastructure to relay data about the status of a home appliance or to indicate whether a door is open or closed. Packet switched technologies such as GPRS may be used as the radio access technology to communicate the status of the technical equipment.

In an additional application area there exists the need for a versatile communications platform, which can be combined with remote health monitoring technology to assist doctors with remote diagnosis of patients.

In an additional application there is the need for a versatile communications which is able to work effectively when the network is temporarily overloaded such that it has the means to store a sound message as a sound byte or convert it using voice recognition software such that it can be forwarded as soon as the network capacity becomes less loaded.

Further to these limitations of existing technologies, and so far as is known, no portable communication apparatus is presently available which serves to offer an improved programmable communicator which is directed towards the specific needs of this problem area as outlined.

OBJECTS OF THE INVENTION

Accordingly, it is an object of the present invention to provide an improved programmable communications apparatus, which can be remotely programmed by any mobile phone or IP device such that it can be linked to any particular fixed or mobile phone or IP device.

It is a further object of the present invention to provide a programmable communications apparatus, which may be programmed at close range using infrared light or a BlueTooth radio connection, or via a terminal-to-terminal network based data call such as the GSM SMS short message service or via a GPRS packet data communication.

It is a further object of the present invention to provide a programmable communications apparatus, which may be programmed by a mobile or fixed device which is able to call up an Internet web page and which comprises the means to instruct the network to reprogram the communications apparatus with the mobile or fixed number to which the programmable communications device is to be linked.

It is a further object of the present invention to provide a programmable communications apparatus, which may be programmed via the Internet such that the network communicates with a device in the vicinity of the programmable communications apparatus which itself causes the said apparatus to be programmed using any means such as wireless communication, infrared light or a BlueTooth radio link.

It is a further object of the present invention to provide a plurality of programmable communications apparatuses, which may be simultaneously programmed by a mobile or fixed device which is able to call up an Internet web page and select one or more apparatuses of the said plurality and cause each of the selected number of apparatuses to be linked to the identical mobile or fixed telephone.

It is a further object of the present invention to provide a programmable communications apparatus, which comprises a processing means to process coded transmissions and permit only transmissions comprising a coded number, which determines the authenticity of the message, to be allowed to program the number to which the said apparatus be linked.

It is a further object of the present invention to provide a programmable communications apparatus, which comprises a wrist strap, or an attachment such as in the case of the smart clothes application, and a first alarm means which can be programmed such that it can cause a message to be sent to the fixed or mobile number to which the said apparatus is linked in the case that the wrist strap be broken or undone or in the case that the said attachment be broken or displaced from an initial position of equilibrium.

It is a further object of the present invention to provide a programmable communications apparatus, which may have a separate pressure sensitive means or displaceable means which becomes activated in the pressed position or displaced position respectively such that it is able to generate an alarm or data message when pressure is removed or when the displacement returns to the non-displaced position. Such a feature serves, by way of example, to replace the need for the wrist strap feature of the previous object such that when the wrist worn communicator is removed from the wrist the pressure sensitive means or displaceable means can provide the required alarm message.

It is a further object of the present invention to provide a programmable communications apparatus, which comprises a heat sensor, which can detect that the communicator is adjacent to a heat source such as the skin of a child and the means to generate an alarm message if the heat source is removed.

It is a further object of the present invention to provide a programmable communications apparatus, which has the means to detect any other detectable physical characteristic of the human skin, which may be used to trigger an alarm if the means is moved away from the skin.

It is a further object of the present invention to provide a programmable communications apparatus for a security application, which comprises an infrared heat detector and which is able to generate an alarm message if a change in the level of infrared radiation is detected.

It is a further object of the present invention to provide a programmable communications apparatus, which may form part of a home network of devices, which is used to monitor a domestic appliance such as a washing machine or a device to monitor whether a door or window is open or closed and to react to a change in status of said appliance or device by sending an alarm message or data message to a linked fixed or mobile telephone or internet IP address to indicate a current status of said appliance or device. In addition the said apparatus may be incorporated in a bicycle frame or attached to a bicycle for monitoring movement of the bicycle.

It is a further object of the present invention to provide a programmable communications apparatus, which has a memory means to store sound as a sound byte for a certain period of time such as the voice of the child wearing the programmable communicator and the means to send this sound to the telephone number to which the said apparatus is linked.

It is a further object of the present invention to provide a programmable communications apparatus, which has a means to store and transmit a sound byte in response to receiving a sound above a predetermined threshold such that a person who is in distress may shout out and the distress call is processed by the programmable communicator and forwarded to the fixed or mobile telephone or IP address to which the said communicator is linked.

It is a further object of the present invention to provide a programmable communications apparatus, which is able to make a call to a linked fixed or mobile telephone or IP address and which if it detects that the telephone number is engaged or does not answer or that the IP address is invalid, the said apparatus has the means to select any other telephone number or IP address in the permitted callers list such that it can be connected to said other telephone or IP device.

It is a further object of the present invention to provide a programmable communications apparatus, which is able to store a sound byte or store a data record and send the sound byte or data record to any other telephone number or IP address in the permitted callers list after a certain interval of time in the instance that the primary number or IP address is engaged or connection is not able to be made at that time due to the network capacity not being sufficient at that time. The feature may also include a continuous retry feature such that the attempt to send the sound byte or data record is continued until the sound byte or data record is successfully sent.

It is a further object of the present invention to provide a programmable communications apparatus, which has the means to convert a voice message into text and send this as a data message to a fixed or mobile telephone or IP address to which the said apparatus is linked.

It is a further object of the present invention to provide a programmable communications apparatus, which is able to receive data from a plurality of data monitoring devices, which may be connected by any wired or wireless means, and that each of said devices has an associated status condition, such that the programmable communications apparatus can transmit data from said devices on request or periodically to a fixed or mobile telephone or IP address to which the said apparatus is linked.

It is a further object of the present invention to provide a programmable communications apparatus, in which the said first alarm means may communicate directly with a central communications point in the network.

It is a further object of the present invention to provide a programmable communications apparatus, in which the said first alarm means may communicate directly with a web page and write information to that page or cause an E-mail to be sent to a specific address.

It is a further object of the present invention to provide a programmable communications apparatus, which comprises a second alarm means, which can be programmed to cause a message to be sent to the fixed or mobile number to which the said apparatus is linked in the case that the battery is low in power or in the case that the battery is removed or in the case that the communicator be switched off.

It is a further object of the present invention to provide a programmable communications apparatus, which comprises a second alarm means, which can be programmed to send a message periodically comprising any status message such as the current power status of the battery.

It is a further object of the present invention to provide a programmable communications apparatus, which comprises a battery charger adapter-pin such that the apparatus can make use of suitable battery chargers of other mobile phones.

It is a further object of the present invention to provide a programmable communications apparatus, which comprises the means to be interrogated remotely by another fixed or mobile telephone or network connected device, such that different codes are used to obtain different data from the said apparatus. In the context of remote health monitoring, by way of example, a doctor could send different codes from her mobile terminal and obtain different data on blood pressure and the heart rate of the person wearing the apparatus associated with a health monitoring system. The said apparatus may make use of physical monitoring means associated with said apparatus for providing information about the skin temperature and blood pressure and other characteristics of the human body.

It is a further object of the present invention to provide a programmable communications apparatus, which has application to smart clothes such that it provides a secondary communications means for emergency service personnel.

It is a further object of the present invention to provide a programmable communications apparatus, which is suitable for attachment to a life vest. A further object of this application includes a water-enabled communications apparatus, which may be used to communicate with a portable central communications unit.

It is a further object of the present invention to provide a programmable communications apparatus, which comprises a GPS signal processing circuit and the means to respond to an authenticated request to determine its own position and send data relating to its position to the linked fixed or mobile telephone or to a location determination centre or to a specified web page.

It is a further object of the present invention to provide a programmable communications apparatus, which may be securely attached to a device such as a bicycle, which may be used for communication and for determining the position of the bicycle.

It is a further object of the present invention to provide a programmable communications apparatus, which is suitable for young children such that it comprises an auto-answer facility to connect the caller immediately with an associated microphone and loudspeaker to avoid the need that the child must press a button to answer the call. This application also includes the feature, which returns the programmable communicator automatically to idle state as soon as the caller to the child terminates the call remotely. This avoids the need that the child must terminate the call. It also prevents the child from terminating the call by accident.

It is a further object of the present invention to provide a programmable communications apparatus, which can be used with mobile location based services such that it is possible for an authenticated person to access a web page, either on a hand-held terminal or fixed device, which shows the position of the programmable communications apparatus as an icon on a map after its position has been determined by its own GPS signal processing circuitry or remotely by the network.

Other objects and advantages of this invention will become apparent from the description to follow when read in conjunction with the accompanying drawings.

SUMMARY OF THE INVENTION

Certain of the foregoing and related objects are readily-attained according to the present invention by the provision of a novel portable programmable communicator, which serves to address the diverse communication requirements of children and elderly persons and for the purposes of remote data monitoring applications such as for monitoring the status of remote technical devices.

The programmable communicator preferably comprises a basic mobile telephone circuit having no keypad or display and a rechargeable battery and antenna and a basic two-way microphone device and remotely pre-programmable identity module linking it to a single mobile or fixed telephone. Where appropriate, in alternative embodiments, the programmable communicator comprises an alarm means to indicate certain conditions of the communicator such as the charge level of its battery or if the battery is removed. Similar alarm messages are generated according to the particular embodiment of the programmable communicator application which include the generation of messages when an associated wrist strap or attachment of the communicator in the case of a smart clothes application is undone or displaced or when the communicator is switched on or off or when the communicator is set to monitor the status condition of an associated device and the status changes beyond a preset threshold level. The invention also includes the generation of periodic messages to indicate that the communicator is working and that any associated status condition thresholds remain unchanged. This last set of messages, which includes periodic reassurances messages includes the facility that the user may set the duration of the period according to the application.

The programmable communicator has direct and effective application to home networks for the purpose of transmitting information about the status condition of domestic appliances such as the pressure of water pipes and whether a door or window is opened or closed. The wireless programmable communicator can be attached to an associated monitoring device and programmed with the number of a mobile or fixed telephone to which it is to be linked or to an Internet web page which can be made accessible to authenticated users or to security monitoring personnel.

Other objects and features of the present invention will become apparent from the following detailed description considered in connection with the accompanying drawings, which disclose one embodiment of the invention. It is to be understood, however, that the drawings are designed for the purpose of illustration only and that the particular description of the portable hot link communicating apparatus is given by way of example only and does not limit the scope of the invention.

BRIEF DESCRIPTION OF THE DRAWINGS

The foregoing features of the invention will be more readily understood by reference to the following detailed description, taken with reference to the accompanying drawings, in which.

DESCRIPTION OF A PREFERRED EMBODIMENT

Figure 1:
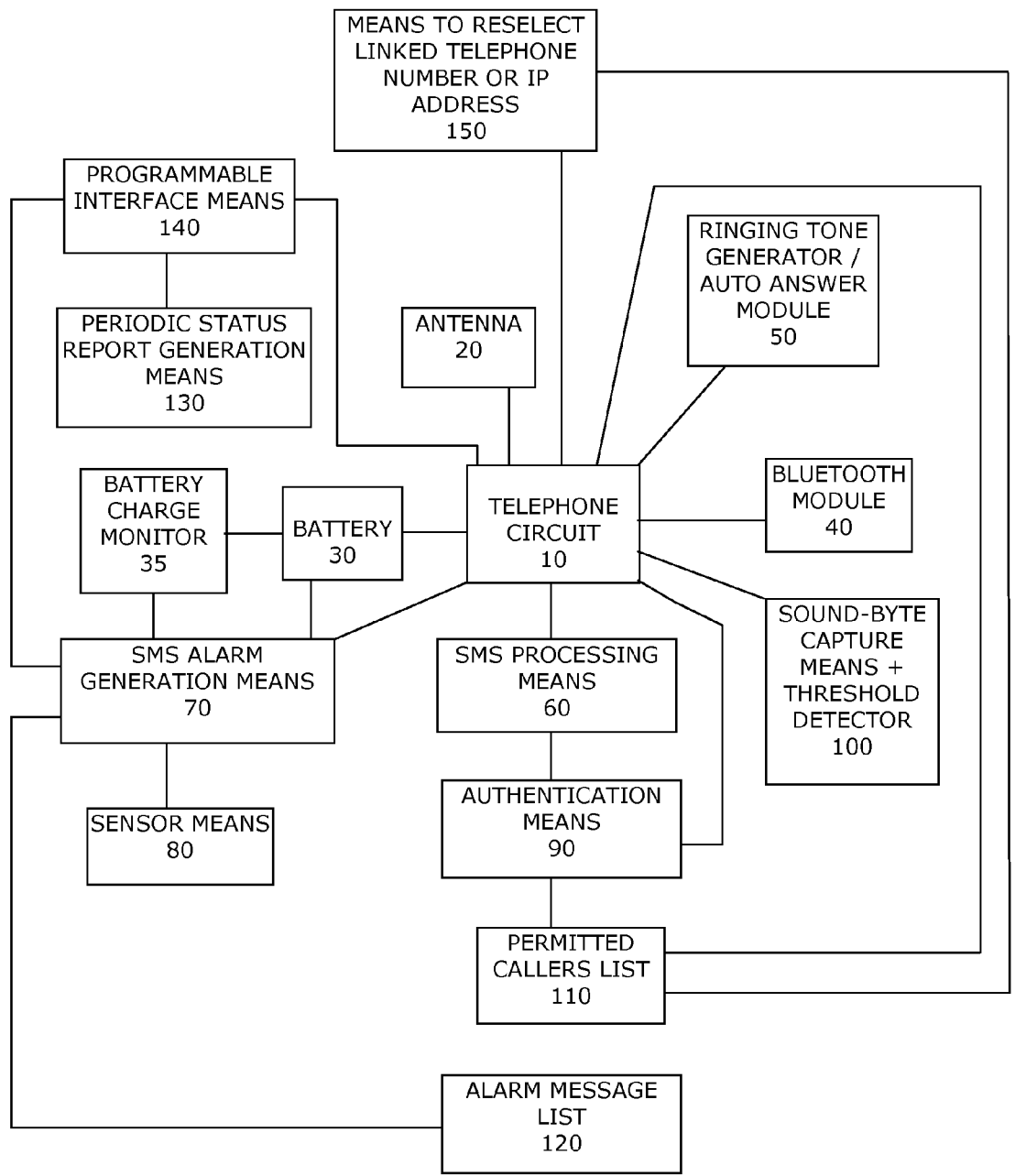
FIG. 1 illustrates the schematic of the programmable communicator according to one embodiment of the invention.
Figure 2:
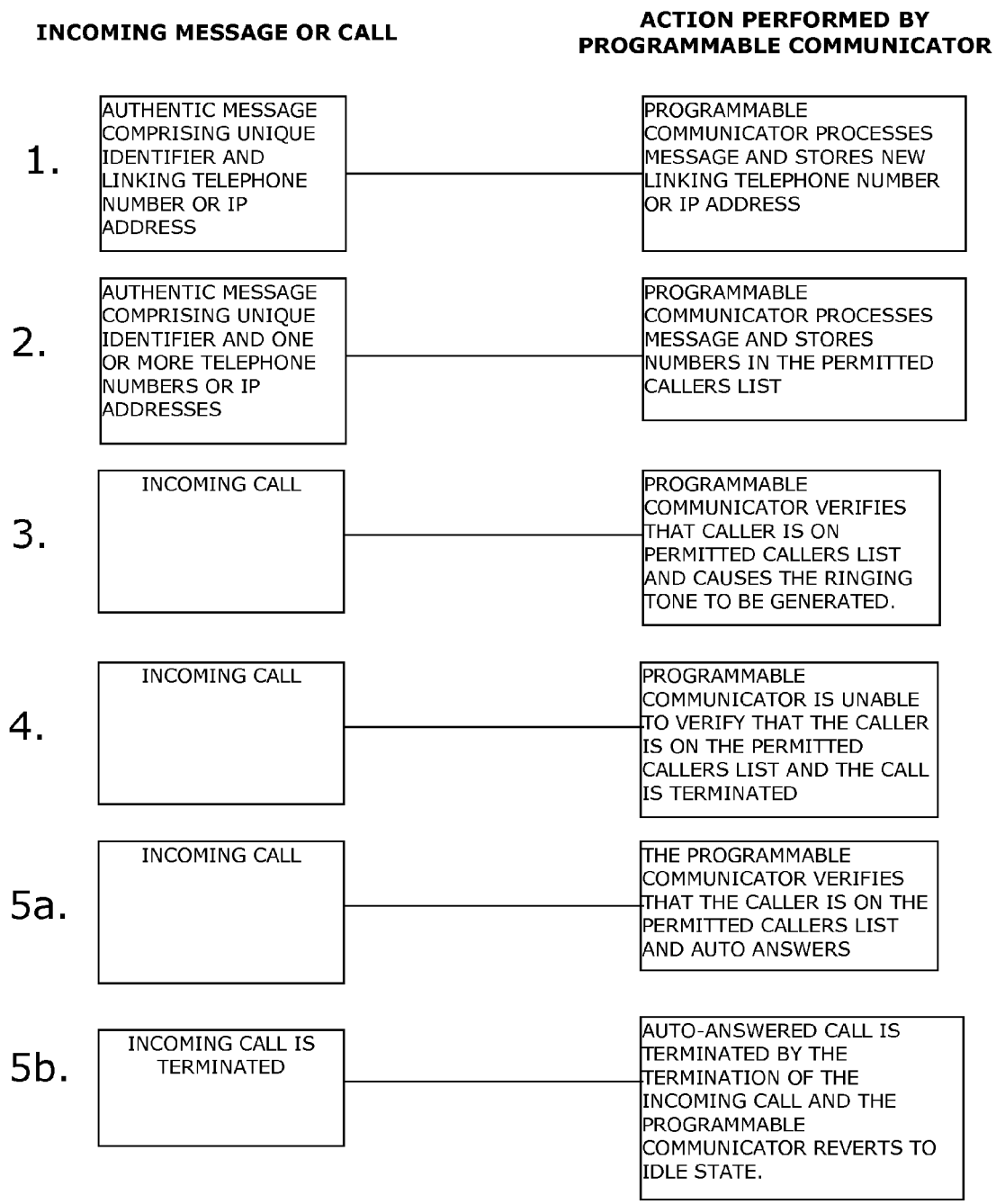
FIG. 2 illustrates a schema showing the actions performed by the programmable communicator in response to an incoming call or message according to the present invention.
Figure 3:
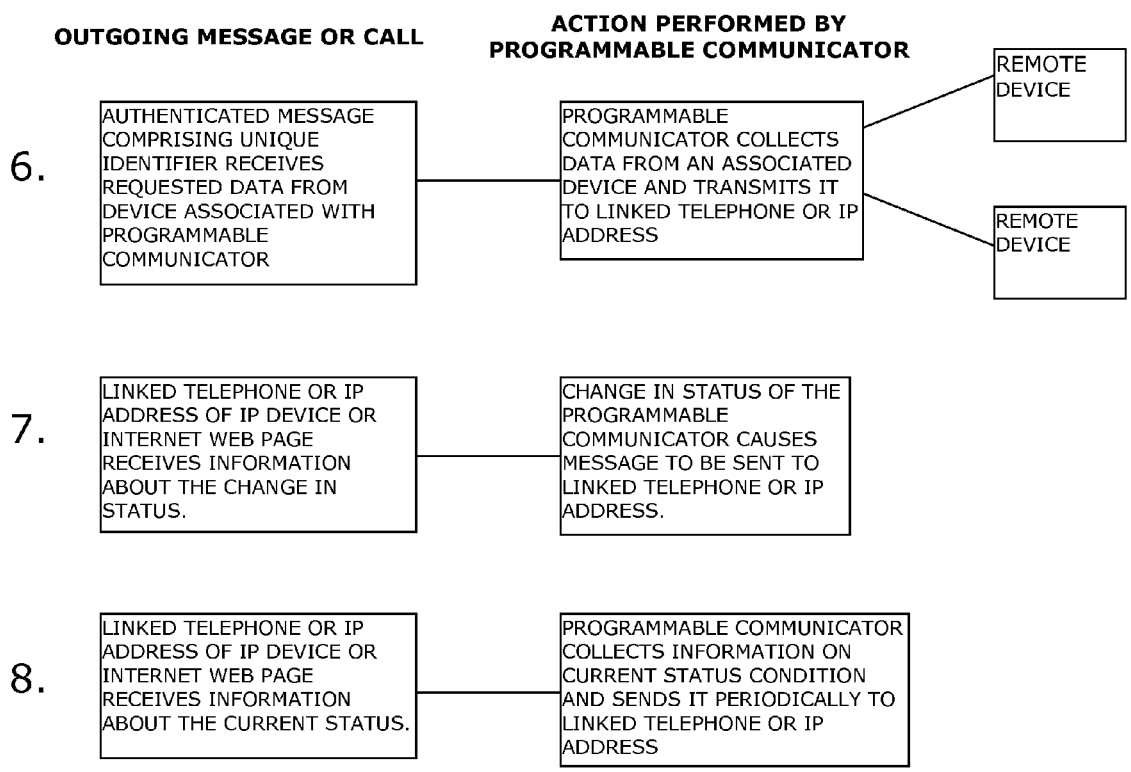
FIG. 3 illustrates a schema showing actions done by the programmable communicator and the outgoing calls or messages, which are generated as a consequence of said actions.

Referring now in detail to the drawings and in particular FIG. 1 thereof, therein illustrated is a programmable communicating apparatus according to one embodiment of the present invention.

The following description makes reference to the detailed features as outlined in the objects of the invention.

In FIG. 1 is shown a telephone circuit 10, which comprises an antenna 20 and a battery 30. To the telephone circuit, which may similarly comprise a communicating PDA device circuit, is shown an optional BlueTooth module 40 for communication with a nearby data communication or programming device having a similar BlueTooth radio module. The telephone circuit 10 has a ringing tone generator and an auto answer module 50 which may be used to cause the programmable communicator to generate one of a number of ringing tones or to auto answer upon receipt of an authenticated permitted caller.

For the purposes of programming the IP address or telephone number of the fixed or mobile telephone to which the communicator is linked is provided an SMS processing means 60. This communicates with an authentication means 90, which in turn is able to store numbers into a permitted callers list 110. For the purposes of security, a sound byte capture means and threshold detector means 100 is provided to generate an alarm message or to send a sound byte to one of the numbers on the permitted callers list. Additional voice recognition software may be used to convert the sound byte into text and send this to the destination telephone number or IP address.

An SMS alarm generation means 70 is provided to work together with a battery charge monitor 35 and a sensor means 80 and an alarm message list 120 and a programmable interface means 140 to generate alarm messages in response to changes in status conditions. Said programmable interface means may be attached to all manner of sensor devices for the purpose of relaying data from external devices and sensors either automatically or in response to a request for information from a remote device.

The periodic status report means 130 may be programmed to provide data on the current status of the programmable communicator as well as data from one or more devices, which may be connected to the communicator via the BlueTooth module 40.

In the case that the programmable communicator is unable to make an immediate connection with the linked telephone or IP address, a reselection means 150 provides one or more connection numbers from the permitted callers list.

This device comprises a novel combination of existing technologies and features, which make possible the existence of a new and improved communicating apparatus to address the communication needs of children and elderly persons and for programmable data tags for monitoring the status of associated technical equipment.

The use of the programmable communicator involves two phases, a pre-programming phase and an active phase. In the pre-programming phase, the communicator is programmed with the number it can call which comprises a unique code. By way of example only, the invention is now described in the context of the GSM mobile telecommunications standard using the Short Message Service or SMS circuit-switched data call. The invention relates to all telephone standards including, and not limited to CDMA and US-TDMA, and is effectively used also in a packet switching mode such as the GSM GPRS packet switching mode. Furthermore the invention is suitably applicable to IP devices, which comprise IP addresses rather than telephone numbers.

According to the invention, it is wished to allow only authenticated callers to change the telephone number or IP address of a fixed or mobile telephone or network device to which the programmable communicator is to be linked. This may be done in GSM using an SMS message, which includes data as well as a unique code such as the unique code of the Subscriber Identity Module or SIM card, often referred to as the PUK code. The PUK code is a unique identifier, which is different for every SIM card. The choice of the PUK is made by way of example only and any similar unique coding may be used for the purpose of the invention It is a straightforward procedure to communicate with the programmable communicator by SMS. The remote transmitting device includes the PUK code of the receiving programmable communicator in its SMS transmission as well as a telephone number to which the programmable communicator is to be linked.

The programmable communicator includes a processing means to determine that the PUK code is correct and the means to store the transmitted number. The PUK code may also be used to program the list of permitted callers. An SMS comprising the PUK code may contain a plurality of telephone numbers each of which designates a permitted caller's number. Only numbers, which are stored as designated permitted callers, will cause the programmable communicator to generate a ringing tone.

Alternatively, the programmable communicator may include circuitry to terminate the calls of non-permitted callers automatically. In the same way that the telephone number of an incoming call can be shown on the screen of a mobile phone before the phone is answered, this information may be used to enable the programmable communicator to receive the call or to reject it.

Additional codes may be used by authenticated callers to interrogate the status condition of the programmable communicator, or to interrogate the status of data monitoring devices to which the communicator is wired or wirelessly attached.

In this way, in the application for an improved child communicator, only persons knowing the secret PUK code would be able to change the calling number. This provides the essential security for the parents. Furthermore, the feature, which causes the communicator to reject all calls but those from telephone numbers on the permitted callers list serves to shield the child from unwelcome contact.

The following example demonstrates how five SMS messages might program the permitted callers list A-E
SMS 1. PUK code A:040 111 1111
SMS 2. PUK code B:040 222 2222
SMS 3. PUK code C:040 333 3333
SMS 4. PUK code D:040 444 4444
SMS 5. PUK code E:040 555 5555

The letters A to E in the five messages or any equivalent coding may be used to designate the priority of the telephone numbers of the permitted callers such that letter A designates the number to which the programmable communicator is linked at this moment.

In a simple use scenario, a child may be playing in the garden or near to the house wearing a programmable communicator programmed to the mother's telephone phone number, 040 111 1111. In the next moment, the father comes home and sends an SMS to the child's programmable communicator using his phone having telephone number 040 222 2222. In this example, the message comprises PUK code A:040 222 2222 which cause the calling number of the programmable communicator to be now reprogrammed to call the father's number if its call button is pressed by the child.

An additional security feature comprises software, which will cause an SMS emergency message to be sent automatically to the pre-programmed number if the wrist strap is broken or undone, or the communicator is switched off. An additional sensor may be used instead of a means to generate an SMS message if the wrist strap is broken or undone whereby said sensor can sense the heat of the skin, which will cause an SMS message to be sent if the communicator is moved away from the skin.

Additional software features may generate messages to indicate the charge of the battery or if the battery drains completely or is removed.

To avoid a total failure condition, the programmable communicator may comprise a separate back-up power supply in addition to the battery, which is sufficient to generate an alarm message or number of alarm messages, in the instance that a power connection is lost from an associated device or if its own battery supply drains completely.

In this way, the telephone number to which the programmable communicator is linked receives messages about the status of the battery and an indication of whether the communicator has been removed from the child.

In a separate embodiment, is included the feature that certain alarm messages are sent to one or more of the telephone numbers, or IP addresses in the IP network application of this invention, which are on the permitted callers list. This feature would enable at least one other person to receive an alarm message in case the primary linked telephone is busy or the associated user of the linked telephone is unable to read the message immediately.

The programmable communicator comprises a processing module, which can receive information about its wrist strap or associated attachment. In the embodiment of a smart clothes tag, the said associated attachment may comprise a fibre or wire, which, if mechanically pulled, causes the generation of an alarm message. Clearly, in the case of a wrist worn communicator, the opening or closing of the wrist strap may be used to activate an electronic circuit to generate a status condition of the wrist strap. It is anticipated that the receiver of the alarm message may then call the child directly, if possible, to check if there is a problem. Additionally, location based services may be used to locate the position of the communicator relative to the network infrastructure.

In a separate embodiment, the programmable communicator comprises a feature, which enables a user to cause it to transmit a status message periodically, according to a periodic duration as set by the user, which will provide reassurance that the communicator is functioning correctly, and for example, that the wrist strap is closed, and that the battery has sufficient power.

The types of data that the communicator can provide periodically, or on request, are determined directly by the application of the invention according to different remote monitoring embodiments. In each application the programmable communicator has the appropriate means to receive the data from the monitoring device and the means to process the data.

The programmable communicator has further direct application to the field of remote data monitoring such as in the home network environment. Today, domestic appliances such as washing machines and sauna heaters remain separate from one another and only a few have the capability to be integrated into remote monitoring applications.

The programmable communicator may be used to generate data messages, which describe the status or change in status beyond a threshold condition, of a household appliance and communicate this data directly to a linked telephone number or IP address of a linked device or Internet web page.

The use of GSM GPRS packet switching technology in this context is ideal since the application does not require a continuous circuit switched connection to the network. The remote monitoring application comprises the use of a programmable communicator, which reacts to a status condition and then initiates a packet data transmission to the network. Consequently, the programmable communicator comprises a separate back-up power supply in addition to the battery, which is sufficient to generate an alarm message or number of alarm messages, in the instance that a power connection is lost from an associated device or if its own battery supply drains completely.

In a separate home-network application, the programmable communicator may be used to gather data from a number of associated monitoring devices and to communicate this to the linked telephone or IP device or Internet web page. The monitoring devices may be directly linked to the programmable communicator by wire or wirelessly connected by, for example, the BlueTooth radio technology in which case the programmable communicator comprises the necessary additional BlueTooth communications module.

In a sports or safety application, the programmable communicator may comprise a smart clothes tag and be sewn into the lining of a life vest such that a person paddling a canoe may use it for urgent communication.

Other applications for the programmable communicator include theme parks and other sports events or places where children may become lost in the crowds.

In addition, the invention may be utilised as a voice and data communicator for bicycles. In this application, data from the bicycle such as speed could be used in sports training as a means to enhance the performance of a cyclist. In a more general application, a programmable communicator can be used to inform the owner of a bicycle that his parked bicycle is being moved and to determine its location, if needed, by making use of the location-based services functionality of the telecommunications network.

While only one embodiment of the present invention: the programmable communicator within the context of the digital GSM telephone system in particular, has been shown and described in detail, it will be obvious to those persons of ordinary skill in the art, that many changes and modifications may be made thereunto without departing from the spirit of the invention. For example, the hot link communicator may make use of any telephone technology such as CDMA, and US-TDMA. Moreover, the inventive features of the programmable communicator may be incorporated into a monitoring device and integrated with it such that the device comprises the capability of the programmable communicator. The invention is not limited to the application of the programmable communicator as a separate device, which separately communicates with data monitoring devices but also includes the application of the functionality of the invention as an integrated part of the monitoring device.

It is further to be understood that the invention may make use of all coding schemes for storing numbers to the programmable apparatus and the use of the PUK code was by way of example only. The programmable communicator may comprise the means to accept all manner of clip on covers so that the same base model may carry one of a number of different covers to suit the tastes and the age groups of different wearers.

What is claimed is:

1. A programmable communicator device comprising:
    a wireless communications circuit for communicating through an antenna over a communications network;
    an identity module for storing a unique identifier that is unique to the programmable communicator device;
    a programmable interface for establishing a communication link with at least one monitored technical device;
    a processing module for authenticating an at least one transmission sent from a programming transmitter and received by the programmable communicator device, the at least one transmission including a coded number and at least one telephone number or Internet Protocol (IP) address corresponding to an at least one monitoring device, wherein the processing module authenticates the at least one transmission by determining if the at least one transmission contains the coded number, the processing module authenticating the at least one transmission if the transmission includes the coded number;
    a memory module for storing the at least one telephone number or IP address from the authenticated transmission as one of one or more permitted callers if the processing module authenticates the at least one transmission by determining that the at least one transmission includes the coded number; and
    wherein the at least one transmission from a programming transmitter comprises a Short Message Service (SMS) data message, or a General Packet Radio Service (GPRS) or other packet switched data message.

2. A programmable communicator device according to claim 1 wherein the programmable interface is programmable via wireless transmissions.

3. A programmable communicator device according to claim 2 wherein the wireless transmissions comprise transmissions compliant with Bluetooth wireless air interface standards.

4. A programmable communicator device according to claim 1 wherein the at least one transmission from a programming transmitter comprises an SMS data message.

5. A programmable communicator device according to claim 1 wherein the at least one transmission from a programming transmitter comprises a GPRS data message.

6. A programmable communicator device according to claim 1 wherein each permitted caller has a corresponding stored telephone number or IP address from which the programmable communicator device is permitted to receive incoming transmissions for processing.

7. A programmable communicator device according to claim 1 wherein each permitted caller has a corresponding stored telephone number or IP address to which the programmable communicator device is permitted to send outgoing transmissions.

8. A programmable communicator device according to claim 1 wherein each permitted caller has a corresponding stored telephone number or IP address from which the programmable communicator device is permitted to receive incoming transmissions for processing, and to which the programmable communicator device is permitted to send outgoing transmissions.

9. A programmable communicator device according to claim 1 wherein storing the at least one telephone number or IP address from the authenticated transmission as one of one or more permitted callers further entails changing, replacing, or reprioritizing one or more previously stored telephone numbers or IP addresses corresponding to one or more other permitted callers.

10. A programmable communicator device according to claim 1 configured to receive data through the programmable interface from an at least one monitored technical device.

11. A programmable communicator device according to claim 10 configured to process the data received through the programmable interface from the at least one monitored technical device.

12. A programmable communicator device according to claim 11, wherein the processing module processes the received data.

13. A programmable communicator device according to claim 11 further configured to request that an at least one monitored technical device send data through the programmable interface for processing by the programmable communicator device.

14. A programmable communicator device according to claim 11 further configured to transmit the processed data to an at least one monitoring device either periodically or in response to a request initiated by the at least one monitoring device.

15. A programmable communicator device according to claim 14, wherein the processing module causes the processed data to be transmitted to the at least one monitoring device.

16. A programmable communicator device according to claim 14 further configured to determine whether the data request initiated by the monitoring device includes a required access code.

17. A programmable communicator device according to claim 16, wherein the processing module determines whether the data request includes the required access code.

18. A programmable communicator device according to claim 11 wherein the received data is processed to determine whether it indicates a change in status of the at least one monitored technical device that crosses a threshold parameter, or that otherwise indicates an alarm condition.

19. A programmable communicator device according to claim 18 further configured to send an at least one transmission for alerting an at least one monitoring device of said change in status or other alarm condition.

20. A programmable communicator device according to claim 19, further comprising an alarm module for sending the at least one transmission for alerting the at least one monitoring device of said change in status or other alarm condition.

21. A programmable communicator device according to claim 10 further configured to request that an at least one monitored technical device send data through the programmable interface for receipt by the programmable communicator device.

22. A programmable communicator device according to claim 10 further configured to transmit the received data to an at least one monitoring device either periodically or in response to a request initiated by the at least one monitoring device.

23. A programmable communicator device according to claim 10, wherein the processing module causes the received data to be transmitted to the at least one monitoring device.

24. A programmable communicator device according to claim 22 further configured to determine whether the data request initiated by the monitoring device includes a required access code.

25. A programmable communicator device according to claim 24, wherein the processing module determines whether the data request includes the required access code.

26. A programmable communicator device according to claim 1 configured to process an at least one data monitoring or data collection request contained in an at least one transmission received from an at least one monitoring device.

27. A programmable communicator device according to claim 1, wherein the processing module processes the at least one data monitoring or data collection request.

28. A programmable communicator device according to claim 1 wherein the communications network is a cellular mobile telecommunications network.

29. A programmable communicator device according to claim 28 wherein the cellular mobile telecommunications network utilizes GSM air interface standards.

30. A programmable communicator device according to claim 28 wherein the cellular mobile telecommunications network utilizes CDMA air interface standards.

31. A programmable communicator device according to claim 1 wherein the coded number included in the at least one transmission is a unique identifier that is unique to the programmable communicator device.

32. A programmable communicator device according to claim 31 wherein the coded number that is unique to the programmable communicator device is associated with a user identity card utilized by the programmable communicator device to access a cellular mobile telecommunications network.

33. A programmable communicator device according to claim 1 wherein a user identity card utilized by the programmable communicator device to access a cellular mobile telecommunications network comprises the identity module for storing a unique identifier.

34. A programmable communicator device according to claim 33, wherein the user identity card is a Subscriber Identity Module (SIM) card.

35. A programmable communicator device according to claim 1 wherein a user identity card utilized by the programmable communicator device to access a cellular mobile telecommunications network comprises the memory module for storing the at least one telephone number or IP address from the authenticated transmission.

36. A programmable communicator device according to claim 35, wherein the user identity card is a SIM card.

37. A programmable communicator device according to claim 1 wherein a portable device connected to the communications network comprises the programming transmitter that sends the at least one transmission including a coded number.

38. A programmable communicator device according to claim 1 wherein a fixed device connected to the communications network comprises the programming transmitter that sends the at least one transmission including a coded number.

39. A programmable communicator device according to claim 1 wherein a device having an Internet web interface comprises the programming transmitter that sends the at least one transmission including a coded number.

40. A programmable communicator device according to claim 1 wherein an at least one monitoring device comprises the programming transmitter that sends the at least one transmission including a coded number.

41. A programmable communicator device according to claim 1 configured to communicate between the at least one monitored technical device and the at least one monitoring device.

42. A programmable communicator device according to claim 1 configured to be incorporated into the at least one monitored technical device such that it becomes an integrated part of the monitored technical device.

43. A programmable communicator device according to claim 1 wherein a central communications point in the communications network comprises the at least one monitoring device.

44. A programmable communicator device according to claim 1 further comprising a location processing module for determining an at least one location of the programmable communicator device, and wherein the programmable communicator device responds to an at least one transmission initiated by an at least one monitoring device requesting that said location data be sent to the monitoring device.

45. A programmable communicator device according to claim 44 wherein the location processing module comprises a Global Positioning System (GPS) module.

46. A programmable communicator device according to claim 1 wherein the monitored technical device is a sensor device.

47. A programmable communicator device according to claim 1 wherein the monitored technical device is a health monitoring system.

48. A programmable communicator device according to claim 47 wherein the programmable communicator receives data from the health monitoring system through the programmable interface representing at least one of body temperature, blood pressure, periodic or continuous electrocardiogram heart rhythm, blood glucose concentration, blood electrolyte concentration, kidney function, liver function, and labor contractions.

49. A programmable communicator device according to claim 1 wherein the monitored technical device is a vending machine.

50. A programmable communicator device according to claim 1 wherein the monitored technical device is a home or domestic appliance.

51. A programmable communicator device according to claim 1 wherein the monitored technical device is at least one of a door status monitoring device, a window status monitoring device, a proximity detector device, and a fire alarm device.

52. A programmable communicator device comprising:
a wireless communications circuit for communicating through an antenna over a communications network;
a programmable interface for establishing a communication link with at least one monitored technical device;
a processing module for authenticating an at least one transmission sent from a programming transmitter and received by the programmable communicator device, the at least one transmission including a coded number and at least one telephone number or Internet Protocol (IP) address corresponding to an at least one monitoring device, wherein the processing module authenticates the at least one transmission by determining if the at least one transmission contains the coded number, the processing module authenticating the at least one transmission if the transmission includes the coded number;
wherein the programmable communicator device uses a memory module for storing the at least one telephone number or IP address from the authenticated transmission as one of one or more permitted callers if the processing module authenticates the at least one transmission by determining that the at least one transmission includes the coded number;
wherein the programmable communicator device uses an identity module for storing a unique identifier that is unique to the programmable communicator device; and
wherein the at least one transmission from a programming transmitter comprises a Short Message Service (SMS) data message, or a General Packet Radio Service (GPRS) or other packet switched data message.

53. A programmable communicator device according to claim 52, wherein the programmable communicator device comprises the identity module.

54. A programmable communicator device according to claim 52 wherein the programmable interface is programmable via wireless transmissions.

55. A programmable communicator device according to claim 54 wherein the wireless transmissions comprise transmissions compliant with Bluetooth wireless air interface standards.

56. A programmable communicator device according to claim 52 wherein the at least one transmission from a programming transmitter comprises an SMS data message.

57. A programmable communicator device according to claim 52 wherein the at least one transmission from a programming transmitter comprises a GPRS data message.

58. A programmable communicator device according to claim 52 wherein each permitted caller has a corresponding stored telephone number or IP address from which the programmable communicator device is permitted to receive incoming transmissions for processing.

59. A programmable communicator device according to claim 52 wherein each permitted caller has a corresponding stored telephone number or IP address to which the programmable communicator device is permitted to send outgoing transmissions.

60. A programmable communicator device according to claim 52 wherein each permitted caller has a corresponding stored telephone number or IP address from which the programmable communicator device is permitted to receive incoming transmissions for processing, and to which the programmable communicator device is permitted to send outgoing transmissions.

61. A programmable communicator device according to claim 52 wherein storing the at least one telephone number or IP address from the authenticated transmission as one of one or more permitted callers further entails changing, replacing, or reprioritizing one or more previously stored telephone numbers or IP addresses corresponding to one or more other permitted callers.

62. A programmable communicator device according to claim 52 configured to receive data through the programmable interface from an at least one monitored technical device.

63. A programmable communicator device according to claim 62 configured to process the data received through the programmable interface from an at least one monitored technical device.

64. A programmable communicator device according to claim 63, wherein the processing module processes the received data.

65. A programmable communicator device according to claim 63 further configured to request that an at least one monitored technical device send data through the programmable interface for processing by the programmable communicator device.

66. A programmable communicator device according to claim 63 further configured to transmit the processed data to an at least one monitoring device either periodically or in response to a request initiated by the monitoring device.

67. A programmable communicator device according to claim 66, wherein the processing module causes the processed data to be transmitted to the at least one monitoring device.

68. A programmable communicator device according to claim 66 further configured to determine whether the data request initiated by the monitoring device includes a required access code.

69. A programmable communicator device according to claim 68, wherein the processing module determines whether the data request includes the required access code.

70. A programmable communicator device according to claim 63 wherein the received data is processed to determine whether it indicates a change in status of the at least one monitored technical device that crosses a threshold parameter, or that otherwise indicates an alarm condition.

71. A programmable communicator device according to claim 70 further configured to send an at least one transmission for alerting an at least one monitoring device of said change in status or other alarm condition.

72. A programmable communicator device according to claim 71, further comprising an alarm module for sending the at least one transmission for alerting the at least one monitoring device of said change in status or other alarm condition.

73. A programmable communicator device according to claim 62 further configured to request that an at least one monitored technical device send data through the programmable interface for receipt by the programmable communicator device.

74. A programmable communicator device according to claim 62 further configured to transmit the received data to an at least one monitoring device either periodically or in response to a request initiated by the monitoring device.

75. A programmable communicator device according to claim 74, wherein the processing module causes the received data to be transmitted to the at least one monitoring device.

76. A programmable communicator device according to claim 74 further configured to determine whether the data request initiated by the monitoring device includes a required access code.

77. A programmable communicator device according to claim 76, wherein the processing module determines whether the data request includes the required access code.

78. A programmable communicator device according to claim 52 configured to process an at least one data monitoring or data collection request contained in an at least one transmission received from an at least one monitoring device.

79. A programmable communicator device according to claim 78, wherein the processing module processes the at least one data monitoring or data collection request.

80. A programmable communicator device according to claim 52 wherein the communications network is a cellular mobile telecommunications network.

81. A programmable communicator device according to claim 80 wherein the cellular mobile telecommunications network utilizes GSM air interface standards.

82. A programmable communicator device according to claim 80 wherein the cellular mobile telecommunications network utilizes CDMA air interface standards.

83. A programmable communicator device according to claim 52 wherein the coded number included in the at least one transmission is a unique identifier that is unique to the programmable communicator device.

84. A programmable communicator device according to claim 83 wherein the coded number that is unique to the programmable communicator device is associated with a user identity card utilized by the programmable communicator device to access a cellular mobile telecommunications network.

85. A programmable communicator device according to claim 52 wherein a user identity card utilized by the programmable communicator device to access a cellular mobile telecommunications network comprises the identity module for storing a unique identifier.

86. A programmable communicator device according to claim 85, wherein the user identity card is a Subscriber Identity Module (SIM) card.

87. A programmable communicator device according to claim 52 wherein a user identity card utilized by the programmable communicator device to access a cellular mobile telecommunications network comprises the memory module for storing the at least one telephone number or IP address from the authenticated transmission.

88. A programmable communicator device according to claim 87, wherein the user identity card is a SIM card.

89. A programmable communicator device according to claim 52 wherein a portable device connected to the communications network comprises the programming transmitter that sends the at least one transmission including a coded number.

90. A programmable communicator device according to claim 52 wherein a fixed device connected to the communications network comprises the programming transmitter that sends the at least one transmission including a coded number.

91. A programmable communicator device according to claim 52 wherein a device having an Internet web interface comprises the programming transmitter that sends the at least one transmission including a coded number.

92. A programmable communicator device according to claim 52 wherein an at least one monitoring device comprises the programming transmitter that sends the at least one transmission including a coded number.

93. A programmable communicator device according to claim 52 configured to communicate between the at least one monitored technical device and the at least one monitoring device.

94. A programmable communicator device according to claim 52 configured to be incorporated into the at least one monitored technical device such that it becomes an integrated part of the monitored technical device.

95. A programmable communicator device according to claim 52 wherein a central communications point in the communications network comprises the at least one monitoring device.

96. A programmable communicator device according to claim 52 further comprising a location processing module for determining an at least one location of the programmable communicator device, and wherein the programmable communicator device responds to an at least one transmission initiated by an at least one monitoring device requesting that said location data be sent to the monitoring device.

97. A programmable communicator device according to claim 52 wherein the location processing module comprises a Global Positioning System (GPS) module.

98. A programmable communicator device according to claim 52 wherein the monitored technical device is a sensor device.

99. A programmable communicator device according to claim 52 wherein the monitored technical device is a health monitoring system.

100. A programmable communicator device according to claim 99 wherein the programmable communicator device receives data from the health monitoring system through the programmable interface representing at least one of body temperature, blood pressure, periodic or continuous electrocardiogram heart rhythm, blood glucose concentration, blood electrolyte concentration, kidney function, liver function, and labor contractions.

101. A programmable communicator device according to claim 52 wherein the monitored technical device is a vending machine.

102. A programmable communicator device according to claim 52 wherein the monitored technical device is a home or domestic appliance.

103. A programmable communicator device according to claim 52 wherein the monitored technical device is at least one of a door status monitoring device, a window status monitoring device, a proximity detector device, and a fire alarm device.

104. A programmable communicator device comprising:
a wireless communications circuit for communicating through an antenna over a communications network;
a programmable interface for establishing a communication link with at least one monitored technical device;
an authentication module for authenticating a data message contained in an at least one transmission sent from a programming transmitter and received by the programmable communicator device, the data message including a coded number and a least one telephone number or Internet Protocol (IP) address corresponding to an at least one monitoring device, wherein the authentication module authenticates the data message by determining if the data message contains the coded number, the authentication module authenticating the data message if it includes the coded number;
a permitted callers programming module for causing a memory module to store the at least one telephone number or IP address from the authenticated data message as one of one or more permitted callers if the authentication module authenticates the data message by determining that it includes the coded number;
wherein the programmable communicator device uses an identity module for storing a unique identifier that is unique to the programmable communicator device; and
wherein the data message contained in the at least one transmission from a programming transmitter is a Short Message Service (SMS) data message, or a General Packet Radio Service (GPRS) or other packet switched data message.

105. A programmable communicator device according to claim 104, wherein the programmable communicator device comprises the identity module.

106. A programmable communicator device according to claim 104 wherein the programmable interface is programmable via data messages.

107. A programmable communicator device according to claim 106 wherein the data messages are contained in transmissions compliant with Bluetooth wireless air interface standards.

108. A programmable communicator device according to claim 104 wherein the at least one transmission from a programming transmitter comprises an SMS data message.

109. A programmable communicator device according to claim 104 wherein the at least one transmission from a programming transmitter comprises a GPRS data message.

110. A programmable communicator device according to claim 104 wherein each permitted caller has a corresponding stored telephone number or IP address from which the programmable communicator device is permitted to receive incoming transmissions for processing.

111. A programmable communicator device according to claim 104 wherein each permitted caller has a corresponding stored telephone number or IP address to which the programmable communicator device is permitted to send outgoing transmissions.

112. A programmable communicator device according to claim 104 wherein each permitted caller has a corresponding stored telephone number or IP address from which the programmable communicator device is permitted to receive incoming transmissions for processing, and to which the programmable communicator device is permitted to send outgoing transmissions.

113. A programmable communicator device according to claim 104 wherein storing the at least one telephone number or IP address from the authenticated data message as one of one or more permitted callers further entails changing, replacing, or reprioritizing one or more previously stored telephone numbers or IP addresses corresponding to one or more other permitted callers.

114. A programmable communicator device according to claim 104 configured to receive data through the programmable interface from an at least one monitored technical device.

115. A programmable communicator device according to claim 114 comprising a processing module for processing the data received through the programmable interface from the at least one monitored technical device.

116. A programmable communicator device according to claim 115 configured to request that an at least one monitored technical device send data through the programmable interface for processing by the processing module.

117. A programmable communicator device according to claim 115 wherein the processing module causes the processed data to be transmitted to an at least one monitoring device either periodically or in response to a request initiated by the at least one monitoring device.

118. A programmable communicator device according to claim 117 configured to determine whether the data request initiated by the monitoring device includes a required access code.

119. A programmable communicator device according to claim 118, wherein the authentication module determines whether the data request includes the required access code.

120. A programmable communicator device according to claim 115 wherein the processing module processes received data to determine whether it indicates a change in status of the at least one monitored technical device that crosses a threshold parameter, or that otherwise indicates an alarm condition.

121. A programmable communicator device according to claim 120 wherein the processing module causes an at least one transmission to be sent for alerting an at least one monitoring device of said change in status or other alarm condition.

122. A programmable communicator device according to claim 114 further configured to request that an at least one monitored technical device send data through the programmable interface for receipt by the programmable communicator device.

123. A programmable communicator device according to claim 114 further configured to transmit the received data to an at least one monitoring device either periodically or in response to a request initiated by the at least one monitoring device.

124. A programmable communicator device according to claim 123 further configured to determine whether the data request initiated by the monitoring device includes a required access code.

125. A programmable communicator device according to claim 124, wherein the authentication module determines whether the data request includes the required access code.

126. A programmable communicator device according to claim 104 comprising a processing module for processing an at least one data monitoring or data collection request contained in an at least one transmission received from an at least one monitoring device.

127. A programmable communicator device according to claim 104 wherein the communications network is a cellular mobile telecommunications network.

128. A programmable communicator device according to claim 127 wherein the cellular mobile telecommunications network utilizes GSM air interface standards.

129. A programmable communicator device according to claim 127 wherein the cellular mobile telecommunications network utilizes CDMA air interface standards.

130. A programmable communicator device according to claim 104 wherein the coded number included in the at least one data message is a unique identifier that is unique to the programmable communicator device.

131. A programmable communicator device according to claim 130 wherein the coded number that is unique to the programmable communicator device is associated with a user identity card utilized by the programmable communicator device to access a cellular mobile telecommunications network.

132. A programmable communicator device according to claim 104 wherein a user identity card utilized by the programmable communicator device to access a cellular mobile telecommunications network comprises the identity module for storing a unique identifier.

133. A programmable communicator device according to claim 132, wherein the user identity card is a Subscriber Identity Module (SIM) card.

134. A programmable communicator device according to claim 104 wherein a user identity card utilized by the programmable communicator device to access a cellular mobile telecommunications network comprises the memory module for storing the at least one telephone number or IP address from the authenticated data message.

135. A programmable communicator device according to claim 134, wherein the user identity card is a SIM card.

136. A programmable communicator device according to claim 104 wherein a portable device connected to the communications network comprises the programming transmitter that sends the at least one transmission containing a data message including a coded number.

137. A programmable communicator device according to claim 104 wherein a fixed device connected to the communications network comprises the programming transmitter that sends the at least one transmission containing a data message including a coded number.

138. A programmable communicator device according to claim 104 wherein a device having an Internet web interface comprises the programming transmitter that sends the at least one transmission containing a data message including a coded number.

139. A programmable communicator device according to claim 104 wherein an at least one monitoring device comprises the programming transmitter that sends the at least one transmission containing a data message including a coded number.

140. A programmable communicator device according to claim 104 configured to communicate between the at least one monitored technical device and the at least one monitoring device.

141. A programmable communicator device according to claim 104 configured to be incorporated into the at least one monitored technical device such that it becomes an integrated part of the monitored technical device.

142. A programmable communicator device according to claim 104 wherein a central communications point in the communications network comprises the at least one monitoring device.

143. A programmable communicator device according to claim 104 further comprising a location processing module for determining an at least one location of the programmable communicator device, and wherein the programmable communicator device responds to an at least one transmission initiated by an at least one monitoring device requesting that said location data be sent to the monitoring device.

144. A programmable communicator device according to claim 143 wherein the location processing module comprises a Global Positioning System (GPS) module.

145. A programmable communicator device according to claim 104 wherein the monitored technical device is a sensor device.

146. A programmable communicator device according to claim 104 wherein the monitored technical device is a health monitoring system.

147. A programmable communicator device according to claim 146 wherein the programmable communicator receives data from the health monitoring system through the programmable interface representing at least one of body temperature, blood pressure, periodic or continuous electrocardiogram heart rhythm, blood glucose concentration, blood electrolyte concentration, kidney function, liver function, and labor contractions.

148. A programmable communicator device according to claim 104 wherein the monitored technical device is a vending machine.

149. A programmable communicator device according to claim 104 wherein the monitored technical device is a home or domestic appliance.

150. A programmable communicator device according to claim 104 wherein the monitored technical device is at least one of a door status monitoring device, a window status monitoring device, a proximity detector device, and a fire alarm device.

151. A programmable communicator device comprising:
a wireless communications circuit for communicating through an antenna over a communications network;
a programmable interface for establishing a communication link with at least one monitored technical device;
an authentication module for authenticating a data message contained in an at least one transmission sent from a programming transmitter and received by the programmable communicator device, wherein the authentication module authenticates the data message by determining if the data message contains a coded number, the authentication module authenticating the data message if it includes the coded number;

a permitted callers programming module for causing a memory module to store as a permitted callers list at least one telephone number or Internet Protocol (IP) address corresponding to an at least one monitoring device;

wherein the permitted callers programming module allows programming changes initiated by the programming transmitter to be made to the permitted callers list if the authentication module has authenticated the data message by determining that it includes the coded number;

wherein the programmable communicator device uses an identity module for storing a unique identifier that is unique to the programmable communicator device; and wherein the data message contained in the at least one transmission from a programming transmitter is a Short Message Service (SMS) data message, or a General Packet Radio Service (GPRS) or other packet switched data message.

152. A programmable communicator device according to claim 151, wherein the programmable communicator device comprises the identity module.

153. A programmable communicator device according to claim 151 wherein the programmable interface is programmable via data messages.

154. A programmable communicator device according to claim 153 wherein the data messages are contained in transmissions compliant with Bluetooth wireless air interface standards.

155. A programmable communicator device according to claim 151 wherein the at least one transmission from a programming transmitter comprises an SMS data message.

156. A programmable communicator device according to claim 151 wherein the at least one transmission from a programming transmitter comprises a GPRS data message.

157. A programmable communicator device according to claim 151 wherein each permitted caller has a corresponding stored telephone number or IP address from which the programmable communicator device is permitted to receive incoming transmissions for processing.

158. A programmable communicator device according to claim 151 wherein each permitted caller has a corresponding stored telephone number or IP address to which the programmable communicator device is permitted to send outgoing transmissions.

159. A programmable communicator device according to claim 151 wherein each permitted caller has a corresponding stored telephone number or IP address from which the programmable communicator device is permitted to receive incoming transmissions for processing, and to which the programmable communicator device is permitted to send outgoing transmissions.

160. A programmable communicator device according to claim 151 wherein the programming changes to the permitted callers list initiated by the programming transmitter entail adding to, changing, replacing, or reprioritizing one or more previously stored telephone numbers or IP addresses corresponding to one or more permitted callers.

161. A programmable communicator device according to claim 151 configured to receive data through the programmable interface from an at least one monitored technical device.

162. A programmable communicator device according to claim 161 comprising a processing module for processing the data received through the programmable interface from the at least one monitored technical device.

163. A programmable communicator device according to claim 162 configured to request that an at least one monitored technical device send data through the programmable interface for processing by the processing module.

164. A programmable communicator device according to claim 162 wherein the processing module causes the processed data to be transmitted to an at least one monitoring device either periodically or in response to a request initiated by the at least one monitoring device.

165. A programmable communicator device according to claim 164 further configured to determine whether the data request initiated by the monitoring device includes a required access code.

166. A programmable communicator device according to claim 165, wherein the authentication module determines whether the data request includes the required access code.

167. A programmable communicator device according to claim 162 wherein the processing module processes the received data to determine whether it indicates a change in status of the at least one monitored technical device that crosses a threshold parameter, or that otherwise indicates an alarm condition.

168. A programmable communicator device according to claim 167 wherein the processing module causes an at least one transmission to be sent for alerting an at least one monitoring device of said change in status or other alarm condition.

169. A programmable communicator device according to claim 161 further configured to request that an at least one monitored technical device send data through the programmable interface for receipt by the programmable communicator device.

170. A programmable communicator device according to claim 161 further configured to transmit the received data to an at least one monitoring device either periodically or in response to a request initiated by the at least one monitoring device.

171. A programmable communicator device according to claim 170 further configured to determine whether the data request initiated by the monitoring device includes a required access code.

172. A programmable communicator device according to claim 171, wherein the authentication module determines whether the data request includes the required access code.

173. A programmable communicator device according to claim 151 comprising a processing module for processing an at least one data monitoring or data collection request contained in an at least one transmission received from an at least one monitoring device.

174. A programmable communicator device according to claim 151 wherein the communications network is a cellular mobile telecommunications network.

175. A programmable communicator device according to claim 174 wherein the cellular mobile telecommunications network utilizes GSM air interface standards.

176. A programmable communicator device according to claim 174 wherein the cellular mobile telecommunications network utilizes CDMA air interface standards.

177. A programmable communicator device according to claim 151 wherein the coded number included in the at least one data message is a unique identifier that is unique to the programmable communicator device.

178. A programmable communicator device according to claim 177 wherein the coded number that is unique to the programmable communicator device is associated with a user identity card utilized by the programmable communicator device to access a cellular mobile telecommunications network.

179. A programmable communicator device according to claim 151 wherein a user identity card utilized by the programmable communicator device to access a cellular mobile telecommunications network comprises the identity module for storing a unique identifier.

180. A programmable communicator device according to claim 179, wherein the user identity card is a Subscriber Identity Module (SIM) card.

181. A programmable communicator device according to claim 151 wherein a user identity card utilized by the programmable communicator device to access a cellular mobile telecommunications network comprises the memory module for storing the at least one telephone number or IP address from the authenticated data message.

182. A programmable communicator device according to claim 181, wherein the user identity card is a SIM card.

183. A programmable communicator device according to claim 151 wherein a portable device connected to the communications network comprises the programming transmitter that sends the at least one transmission containing a data message including a coded number.

184. A programmable communicator device according to claim 151 wherein a fixed device connected to the communications network comprises the programming transmitter that sends the at least one transmission containing a data message including a coded number.

185. A programmable communicator device according to claim 151 wherein a device having an Internet web interface comprises the programming transmitter that sends the at least one transmission containing a data message including a coded number.

186. A programmable communicator device according to claim 151 wherein an at least one monitoring device comprises the programming transmitter that sends the at least one transmission containing a data message including a coded number.

187. A programmable communicator device according to claim 151 configured to communicate between the at least one monitored technical device and the at least one monitoring device.

188. A programmable communicator device according to claim 151 configured to be incorporated into the at least one monitored technical device such that it becomes an integrated part of the monitored technical device.

189. A programmable communicator device according to claim 151 wherein a central communications point in the communications network comprises the at least one monitoring device.

190. A programmable communicator device according to claim 151 further comprising a location processing module for determining an at least one location of the programmable communicator device, and wherein the programmable communicator device responds to an at least one transmission initiated by an at least one monitoring device requesting that said location data be sent to the monitoring device.

191. A programmable communicator device according to claim 190 wherein the location processing module comprises a Global Positioning System (GPS) module.

192. A programmable communicator device according to claim 151 wherein the monitored technical device is a sensor device.

193. A programmable communicator device according to claim 151 wherein the monitored technical device is a health monitoring system.

194. A programmable communicator device according to claim 193 wherein the programmable communicator device receives data from the health monitoring system through the programmable interface representing at least one of body temperature, blood pressure, periodic or continuous electrocardiogram heart rhythm, blood glucose concentration, blood electrolyte concentration, kidney function, liver function, and labor contractions.

195. A programmable communicator device according to claim 193 wherein the monitored technical device is a vending machine.

196. A programmable communicator device according to claim 151 wherein the monitored technical device is a home or domestic appliance.

197. A programmable communicator device according to claim 151 wherein the monitored technical device is at least one of a door status monitoring device, a window status monitoring device, a proximity detector device, and a fire alarm device.

* * * * *

UNITED STATES PATENT AND TRADEMARK OFFICE
CERTIFICATE OF CORRECTION

| | | |
|---|---|---|
| PATENT NO. | : 8,094,010 B2 | Page 1 of 1 |
| APPLICATION NO. | : 12/538603 | |
| DATED | : January 10, 2012 | |
| INVENTOR(S) | : Eveline Wesby-van Swaay | |

It is certified that error appears in the above-identified patent and that said Letters Patent is hereby corrected as shown below:

In Col. 14, line 7
replace "claim 10"
with "claim 22"

In Col. 14, line 22
replace "claim 1"
with "claim 26"

In Col. 19, line 4
replace "claim 52"
with "claim 96"

In Col. 26, line 33
replace "claim 193"
with "claim 151"

Signed and Sealed this
Thirteenth Day of March, 2012

David J. Kappos
*Director of the United States Patent and Trademark Office*